United States Patent [19]
Goldinger et al.

[11] B 3,921,789
[45] Nov. 25, 1975

[54] METHOD AND APPARATUS FOR TRANSFERRING ARTICLES FROM A CONVEYOR

[75] Inventors: John A. Goldinger, Boiling Springs, Pa.; Dwight R. Peterson, Burkburnett, Tex.

[73] Assignee: PPG Industries, Inc., Pittsburgh, Pa.

[22] Filed: Feb. 8, 1974

[21] Appl. No.: 440,898

[44] Published under the Trial Voluntary Protest Program on January 28, 1975 as document no. B 440,898.

[52] U.S. Cl. ............................ 198/31 AB; 198/20 R
[51] Int. Cl.² .......................................... B65G 47/26
[58] Field of Search ............ 198/20 T, 31 R, 31 AB, 198/20 R; 271/225, 64

[56] References Cited
UNITED STATES PATENTS
1,776,201  9/1930  Clair et al. ......................... 198/20 T
2,536,756  1/1951  Lopez ................................ 198/20 T
3,680,677  8/1972  Branch et al. ..................... 198/20 R

*Primary Examiner*—E. C. Blunk
*Assistant Examiner*—Victor N. Sakran
*Attorney, Agent, or Firm*—Dennis G. Millman

[57] ABSTRACT

A junction of a main line conveyor and a branch line conveyor is provided with a vertically movable transfer unit having upper and lower conveyor sections. When an article is being transferred from either section, the other section is aligned with the main line conveyor so as to permit continuance of conveyance along the main line during at least some of the transfer operation.

27 Claims, 3 Drawing Figures

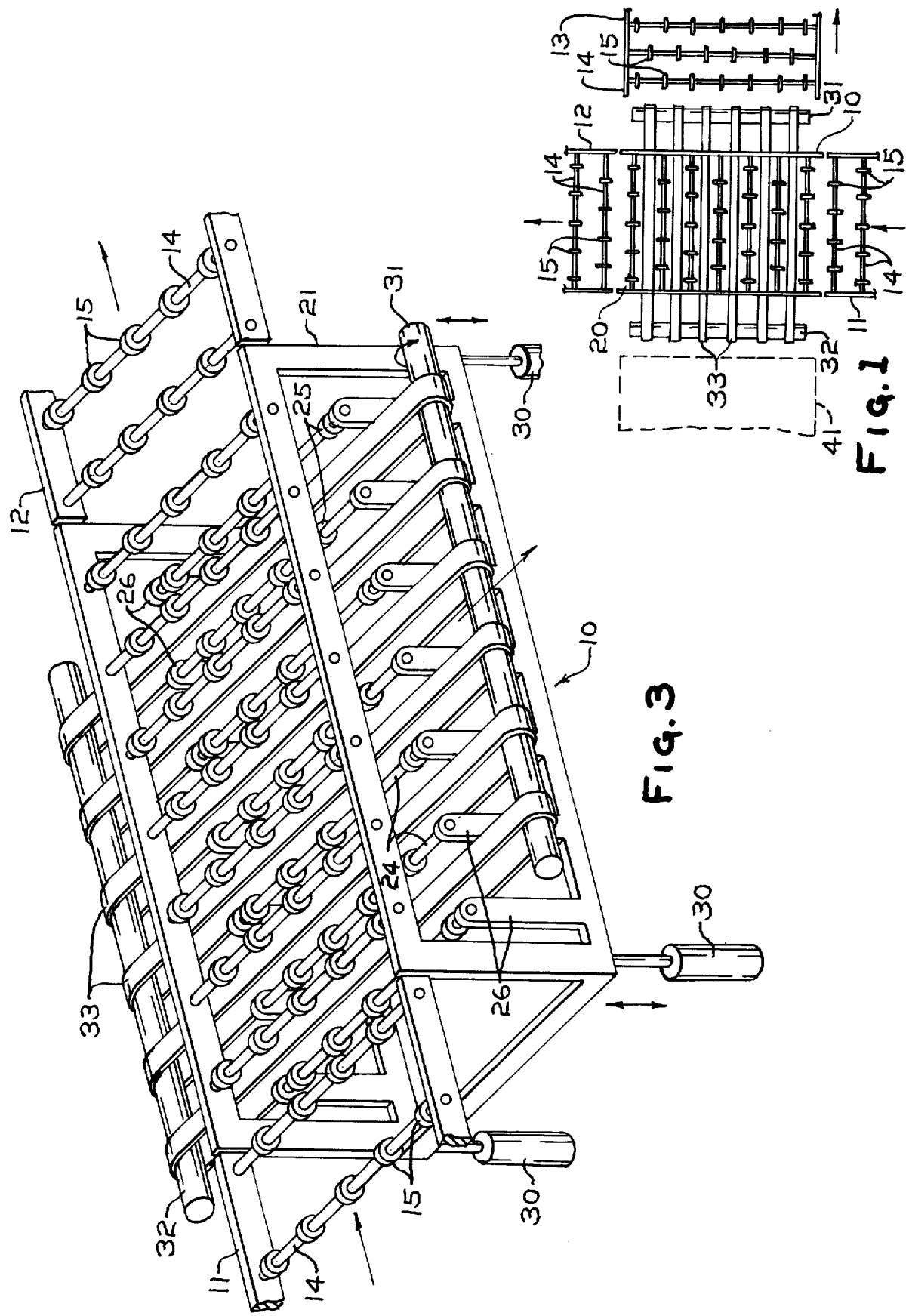

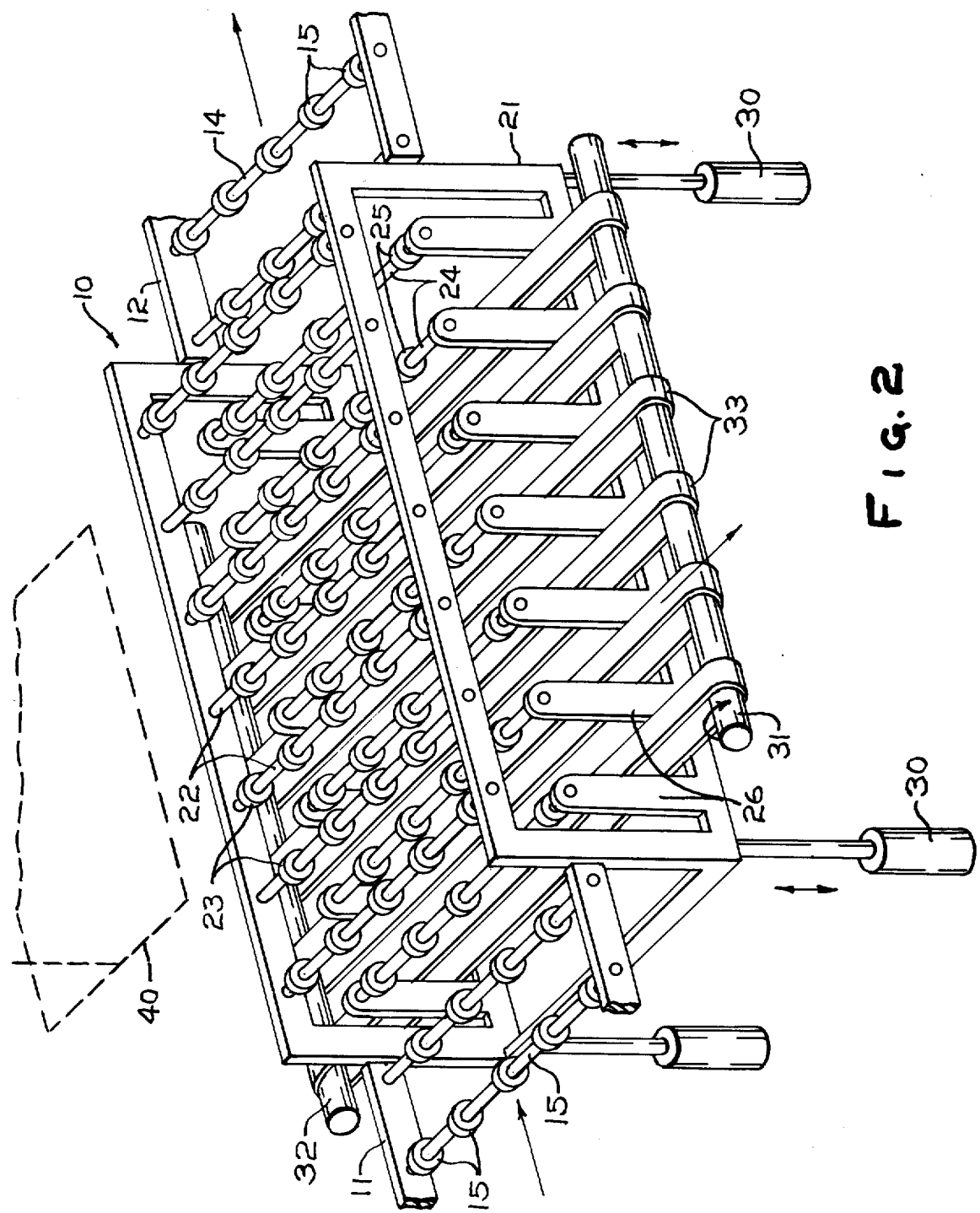

METHOD AND APPARATUS FOR TRANSFERRING ARTICLES FROM A CONVEYOR

BACKGROUND OF THE INVENTION

This invention relates to the conveying of articles, and more particularly to the tranfer of articles, from a main line conveyor to a branch line conveyor in a rapid and efficient manner that entails minimum interruption of the passage of articles on the main line conveyor. Although the broad concept of the invention is applicable to conveying solid articles of any configuration, it is particularly pertinent to the conveying of materials whose length and width are substantial relative to the spacing between successive articles on a main line conveyor, such as sheets of glass, plywood, cardboard, plasterboard, and the like.

When discrete sheet-like articles are manufactured in a continuous process and conveyed from the forming stage on a single main line conveyor, it is often found desirable to divert some of the sheets from the main line conveyor to one or more branch line conveyors for the purpose of performing diverse finishing operations on the articles or because subsequent operations are slower than the forming process and therefore require a plurality of stations. The prior art has utilized various types of transfer units for removing some of the articles from the main line conveyor. One approach utilizes a hoist means which grasps the article, raises it, translates it transversely of the main line conveyor, and deposits the article on the branch line. U.S. Pat. No. 3,168,184 to S. N. Galvin typifies the hoist approach, wherein suction means are utilized to engage sheets of glass. Another conventional system, known as a "corner table," utilizes a set of transversely oriented, vertically movable rollers or belts between the rollers in a section of the main line conveyor. The transverse rollers are raised above the level of the main line rollers and driven to lift the transferring article and convey it onto the branch line conveyor.

The prior art arrangements are disadvantageous because they require conveying on the main line to be suspended for an extended period of time while the transfer operation is being completed. In the case of the hoist, the article to be transferred must be brought to a stop on a section of the main line while the hoist is gently lowered, engaged, and raised, during which time the conveying of subsequent articles along the main line is blocked. As a result, either a wide spacing between articles on the main line must be maintained, or the main line conveyor must be halted or slowed in order to provide sufficient time for the transferring article to be cleared from the main line. Likewise, the use of a corner table causes the main line to be blocked while the rollers or belts are raised and the article is passed laterally onto the branch line conveyor.

These inherent speed limitations with prior art lateral transfer units can cause such units to be the bottlenecks in modern manufacturing processes where the forming stage is capable of greater output than can be handled by the conveyor system. For example, the speed of glassmaking operations has now been increased to the point where the transfer units used to divert sheets of glass to various cutting lines or stacking operations can become a limiting factor on overall productivity. More specifically, in a modern glassmaking operation, there may be an interval of no more than twelve seconds between successive sheets of glass being conveyed toward the wareroom area and sometimes as little as four seconds. But using a hoist to perform a lateral transfer generally consumes at least 9 seconds on the main line, more usually around 11 seconds. Corner tables are generally even slower. Thus, it can be seen that conventional transfer units are taxed beyond their capabilities on the faster lines, or at best afford a very risky margin of error.

A solution to this problem has been suggested in U.S. Pat. No. 3,680,677 to Branch et al., where there is provided an overhead vacuum conveyor at the junction of a main line and a branch line which picks up and transfers a sheet over the junction so as to continue on the main line while another sheet is being diverted to the branch line by a conventional corner table. The Branch et al., arrangement possesses a number of disadvantages, however, of which the following may be mentioned: the complex apparatus with its relatively large number of moving parts and its large vacuum system raise the initial cost and operating cost, require greater amounts of maintenance, and are more susceptible to failure; lifting the sheets of glass over the junction causes the glass to be flexed, which increases the danger of breakage; and the operation is highly dependent on the steady maintenance of a strong, uniform vacuum, failure of which can result in breakage and interruption of the line.

SUMMARY OF THE INVENTION

The present invention permits faster transfer to branch line conveyors with a method and apparatus that are simple, economical, versatile, and safe. There is provided a two-layered transfer unit having upper and lower conveyor sections adapted to convey articles along a main line conveyor. The two sections can be elevated or lowered as a unit to align either the upper or lower section with the main line conveyor. When in the elevated position, the lower section is in alignment with the main line, and an article progressing down the main line can pass through the unit and continue on the main line, or it can be stopped on the lower section for transfer to the branch line. When the unit is lowered, the upper section is aligned with the main line conveyor so that a subsequent article progressing along the main line can immediately pass over the transfer unit, and the lower section is aligned with the transversely extending branch line, which is at a lower elevation. An article that has been stopped on the lower section is engaged by transversely oriented rollers or belts when the unit is lowered and the article is conveyed off of the section and onto the branch line in essentially the same manner as conventional corner tables. The unit can then be raised to repeat the cycle.

The greater speed of the present invention is attributable to the fact that the only interruption to main line conveying is the raising and lowering of the unit, steps that consume a mere fraction of the total time normally required to complete a transfer. For example, raising or lowering such a unit can be accomplished in about two seconds, which leaves an adequate margin of error on even the fastest lines. Yet, the invention has the simplicity and reliability of a conventional corner table.

The invention will be more fully understood from the following detailed description of the preferred embodiments. Although the preferred embodiments are described in the context of a glass manufacturing operation, it should be understood that the invention is not limited to such a use.

BRIEF DESCRIPTION OF THE DRAWINGS

FIG. 1 is a schematic plan view of a junction between a main line conveyor and a branch line conveyor.

FIG. 2 is a perspective view of the inventive transfer unit in its raised position.

FIG. 3 is a perspective view of the inventive transfer unit in its lowered position.

DETAILED DESCRIPTION OF THE PREFERRED EMBODIMENTS

FIG. 1 shows diagrammatically the layout of a portion of a generally horizontal conveyor system in accordance with the present invention in which a transfer unit 10 is interposed between an upstream section of main line conveyor 11 and a downstream section of main line conveyor 12, the latter two being at the same elevation. A branch line conveyor 13 extends laterally from the transfer unit in a direction transverse to the main line conveyor, and at a lower elevation. A specific application lies in the field of manufacturing flat glass where sheets of glass, having been cross-cut from a continuous ribbon after formation, are passed along a main line conveyor and are distributed to a plurality of stacking or cutting stations via branch line conveyors such as conveyor 13. For handling glass, the conveyors are conventionally comprised of parallel driven shafts 14 having a plurality of polyurethane doughnut rollers 15 mounted thereon. Alternatively, conveyor sections 11, 12 and 13 may be belt conveyors.

Referring now to FIGS. 2 and 3, the transfer unit 10 can be seen as based on a parallelepiped frame 21 on which are mounted two vertically spaced conveyor sections, one overlying the other, and in generally horizontal, parallel planes. The upper conveyor section is comprised of parallel shafts 22 having doughnut rollers 23 in the same manner as on the main line conveyor. The upper conveyor section could alternatively be a belt conveyor. The lower conveyor section is likewise comprised of shafts 24 and doughnut rollers 25, the shafts being individually mounted on upstanding stems 26. The upper and lower sections are each independently driven by conventional means (not shown) and are oriented so as to convey a sheet in the same direction as the main line conveyor.

The frame 21 is vertically translated by means of hydraulic cylinders 30 at the four corners of the frame, or a single hydraulic cylinder located at the center of the underside of frame 21 to obviate synchronization problems. The control means associated with the hydraulic cylinder 30 may be set to provide two operative vertical positions of the frame. An elevated position, shown in FIG. 2 aligns the rollers 25 in the lower conveyor section with rollers 15 in the main line conveyor so that a sheet of glass may pass directly through the transfer unit uninterrupted in its travel down the main line conveyor. A lowered position, illustrated in FIG. 3 aligns the upper section rollers 23 with main line rollers 15 to provide a continuous path for sheets on the main line when the transfer unit is in that position. A pair of vertically fixed pulleys 31 and 32, one of which is driven in any suitable manner and the other of which is an idler, carry a plurality of transversely extending take-off belts 33 which pass between the stems 26. The elevation of the upper flights of the belts 33 are slightly higher than the uppermost extent of the rollers 25 on the lower conveyor section when the frame 21 is in the lowered position, so that a sheet carried on the rollers 25 will be deposited onto the belts when the frame is lowered and will be transported by the belts in a direction transverse to the main line conveyor. In place of the belts 33, it would also be possible to use an array of driven wheels oriented transverse to rollers 25.

Branch line conveyor 13 (not shown in FIGS. 2 and 3 for the sake of clarity) is positioned with its receiving end closely adjacent pulley 31, and at an elevation below that of the main line conveyor such that the upper extent of the branch line rollers 15 is co-planar with the upper flights of take-off belts 33. Thus, a sheet received on belts 33 will be carried out of the transfer unit and onto the branch line.

Additional versatility may be attained by the addition of a conventional hoist, represented by broken lines 40 in FIG. 2, over the tranfer unit to remove or replace sheets on the upper section rollers 23. In the case of glass handling, the hoist may be of the vacuum type, comprised of an array of suctioncup-like members as is well known in the art. With the addition of a hoist, a sheet that has been stopped on the upper section of the conveyor may be removed from the transfer unit when it is in the raised position while subsequent sheets progress along the main line by way of the lower section of the transfer unit. The hoist may be used in addition to or in place of the take-off belts 33 for introducing sheets onto the branch line 13, although the belts are preferred. The hoist also permits transfers to a second branch line conveyor or work station other than branch line 13, such as a conveyor 41 (represented by broken lines in FIG. 1) extending transversely from the main line on the opposite side from branch line 13. Additionally, the hoist may be utilized to add additional sheets to the main line flow, such as in the case of special orders of glass sheets that have been taken from storage and which are to be processed downstream from the transfer unit.

In normal operation, the frame 21 is in the raised position as shown in FIG. 2, whereby sheets pass from upstream main line conveyor 11 to downstream main line conveyor 12 via rollers 25 on the lower section of the transfer unit. When it is desired to divert a sheet to the branch line conveyor 13, the driving of shafts 24 is stopped when the sheet is centered on the lower section of the transfer unit. Frame 21 is then rapidly dropped to the lowered position (FIG. 3) and shafts 22 are begun to be driven so as to carry the next sheet coming down the main line across the upper section of the transfer unit. When the frame reaches the lowered position, the sheet being transferred has already been lifted from rollers 25 by the take-off belts 33, and is being carried by belts toward branch line 13. When the transferred sheet has cleared the frame 21, the frame may be quickly raised during an interval between sheets on the main line to restart the cycle. But, if it were desired to remove a sheet with the hoist, the frame would not be immediately raised. Instead, the driving of shafts 22 would be stopped when a sheet is centered on the upper section of the transfer unit, and the frame then moved to the raised position where hoist may operate on the stopped sheet without interrupting the progress of sheets along the main line conveyor and the lower section of the transfer unit.

Although the preferred embodiment has been described with particular references to the conveying of sheets, and specifically to glass sheets, it should be apparent that the invention may be readily adapted to the handling of a wide variety of article shapes merely by providing a transfer unit as disclosed with appropriate dimensions. It is to be understood that other modifications and variations as are known to those of skill in the art may be resorted to without departing from the spirit and scope of the invention as defined by the appended claims.

We claim:

1. An apparatus for transferring articles in a transverse direction from a generally horizontal main line conveyor upon which said articles are being conveyed at close intervals, without interrupting said conveying, comprising:
   a vertically movable frame supporting a generally horizontal lower conveyor section and a generally horizontal upper conveyor section overlying and vertically spaced from said lower conveyor section; each of said upper and lower conveyor sections including means to convey an article in one given direction;
   means for vertically moving said frame to selectively align said upper conveyor section and said lower conveyor section with an elevation corresponding to the elevation of a main line conveyor;
   means for transporting an article off one of said conveyor sections in a direction transverse to said given direction when the other of said conveyor sections is aligned with said elevation of a main line conveyor.

2. The apparatus of claim 1 wherein said means for transporting comprises transversely oriented conveyor means extending within said frame at a height at which an article carried by said lower conveyor section will be engaged by said transversely oriented conveyor means when said upper conveyor section is in alignment with said main line conveyor.

3. The apparatus of claim 2 wherein said lower conveyor section is comprised of a plurality of rollers on shafts rotatably mounted on elongated, upstanding stems, and said transversely oriented conveyor means comprises a belt conveyor having a plurality of belts extending between said rollers.

4. The apparatus of claim 1 wherein said means for transporting comprises hoist means extendable over said frame at an elevation at which said hoist means may engage an article carried by said upper conveyor section when said lower conveyor section is aligned with said main line conveyor.

5. The apparatus of claim 2 wherein there is additionally provided a hoist means extendable over said frame at an elevation at which said hoist means may engage an article carried by said upper conveyor section when said lower conveyor section is aligned with said main line conveyor.

6. A conveyor system comprising:
   a generally horizontal main line conveyor having means for conveying articles in a given direction;
   at least one work station laterally displaced from said main line conveyor;
   a vertically movable frame interposed between upstream and downstream main line conveyor sections adjacent to said work station, said frame supporting a generally horizontal lower conveyor section and a generally horizontal upper conveyor section overlying and vertically spaced from said lower conveyor section; each of said upper and lower conveyor sections having means to convey an article in the same given direction as said main line conveyor; and
   means for vertically moving said frame to selectively align said upper conveyor section and said lower conveyor section with the elevation of said main line conveyor; and
   means for transporting an article off one of said conveyor sections and toward said work station when the other of said conveyor sections is aligned with said elevation of said main line conveyor.

7. The system of claim 6 wherein said means for transporting comprise transversely oriented conveyor means extending within said frame at a height at which an article carried by said lower conveyor section will be engaged by said transversely oriented conveyor means when said upper conveyor section is in alignment with said main line conveyor.

8. The system of claim 7 wherein said lower conveyor section is comprised of a plurality of rollers on shafts rotatably mounted on elongated, upstanding stems, and said transversely oriented conveyor means comprise a belt conveyor having a plurality of belts extending between said rollers.

9. The system of claim 7 wherein said work station comprises a branch line conveyor extending transversely from said main line conveyor with the entrance end of said branch line aligned with the discharge end of said transversely oriented conveyor means.

10. The system of claim 6 wherein said means for transporting comprises hoist means extendable over said frame at an elevation at which said hoist means may engage an article carried by said upper conveyor section when said lower conveyor section is aligned with the elevation of said main line conveyor.

11. The system of claim 9 wherein there is additionally provided hoist means extendable over said frame at an elevation at which said hoist means may engage an article carried by said upper conveyor section when said lower conveyor section is aligned with the elevation of said main line conveyor.

12. The system of claim 11 wherein there is provided an auxilliary work station on the opposite side of said main line conveyor from said branch line conveyor, adapted to receive articles transported by said hoist means.

13. A method of transferring articles toward a transversely displaced work station from a main line conveyor upon which said articles are being horizontally conveyed at close intervals comprising the steps of:
   a. aligning a first conveyor section between upstream and downstream portions of the main line conveyor so as to provide a continuous path for conveyance of articles therebetween;
   b. stopping a selected article on said first conveyor section;
   c. vertically translating said first conveyor section out of alignment with said main line conveyor portions, and aligning a second conveyor section with said main line conveyor portions in place of said first conveyor section so as to restore the continuous path for conveyance of articles therebetween;
   d. transferring said selected article from said first conveyor section in a direction transverse to said main line conveyor, and at the same time conveying a subsequent article from said upstream portion to said downstream portion of the main line conveyor by way of said second conveyor section;
   e. vertically translating said first and said second conveyor sections so as to return said first section into alignment with said main line portions and to remove said second section from alignment with said main line portions; and f. repeating the sequence of steps (a) through (e) for each article to be transferred, whereby transfers from the main line are accomplished without affecting the continuous conveying of articles along the main line conveyor.

14. The method of claim 13 wherein said second conveyor section overlies said first conveyor section, the vertical translating of step (c) comprises lowering said first and second conveyor sections as a unit, the vertical translating of step (e) comprises raising said first and second conveyor sections as a unit, and the transferring of step (d) is accomplished by means of belts which extend into the area of said first conveyor section when said first conveyor section is in the lowered position, said selected article being lifted from said first conveyor section by said belts and carried toward said work station by said belts when said first conveyor section is lowered.

15. The method of claim 14 wherein said work station comprises the entrance end of a branch line conveyor extending transversely from said main line at an elevation aligned with said belts, and the transferring of step (d) comprises introducing said selected article onto said branch line conveyor.

16. The method of claim 15 wherein said articles are in the form of sheets.

17. The method of claim 16 wherein the intervals between successive sheets being conveyed on the main line conveyor are about twelve seconds or less, and the vertical translating of step (c) and the vertical translating of step (e) are performed during said intervals.

18. The method of claim 13 wherein said first conveyor section overlies said second conveyor section, the vertical translating of step (c) comprises raising said first and second conveyor sections as a unit, the vertical translating of step (e) comprises lowering said first and second conveyor sections as a unit, and the transferring of step (d) comprises engaging said selected article on said first conveyor section when in the raised postion with hoist means, lifting said selected article from said first conveyor section with said hoist means, and depositing said selected article onto said work station.

19. The method of claim 18 wherein said articles are in the form of sheets.

20. The method of claim 19 wherein the intervals between successive sheets being conveyed on the main line conveyor are about 12 seconds or less, and the vertical translating of step (c) and the vertical translating of step (e) are performed during said intervals.

21. A method of introducing an article into a stream of articles being conveyed at close intervals on a main line conveyor comprising the steps of:

a. aligning a first conveyor section between upstream and downstream portions of the main line conveyor so as to provide a continuous path for conveyance of articles therebetween;

b. vertically translating said first conveyor section out of alignment with said main line conveyor portions, and aligning a second conveyor section with said main line conveyor portions in place of said first conveyor section so as to restore the continuous path for conveyance of articles therebetween;

c. transferring an article to be inserted onto said first conveyor section, and at the same time conveying another article from said upstream portion to said downstream portion of the main line conveyor by way of said second conveyor section;

d. vertically translating said first and said second conveyor sections so as to return said first section into alignment with said main line portions and to remove said second section from alignment with said main line portions;

e. operating said first conveyor section to carry said article to be inserted onto said downstream portion of the main line conveyor; and f. repeating the sequence of steps (a) through (e) for each article to be inserted, whereby the insertions are made without affecting the continuous conveying of articles along the main line conveyor.

22. The method of claim 21 wherein said second conveyor section overlies said first conveyor section, the vertical translating of step (b) comprises lowering said first and second conveyor sections as a unit, the vertical translating of step (d) comprises raising said first and second conveyor sections as a unit, and the transferring of step (c) comprises conveying the article to be inserted onto said first conveyor section on belts which extend into the area of said first conveyor section when said first conveyor section is in the lowered position, said article to be inserted being lifted from said belts when said first conveyor section is raised.

23. The method of claim 22 wherein said articles are in the form of sheets.

24. The method of claim 23 wherein the intervals between successive sheets being conveyed on the main line conveyor are about twelve seconds or less, and the vertical translating of step (b) and the vertical translating of step (d) are performed during said intervals.

25. The method of claim 21 wherein said first conveyor section overlies said second conveyor section, the vertical translating of step (b) comprises raising said first and second conveyor sections as a unit, the vertical translating of step (d) comprises lowering said first and second conveyor sections as a unit, and the transferring of step (c) comprises engaging said article to be inserted with hoist means and depositing said article to be inserted onto said first conveyor section while said first conveyor section is in the raised position.

26. The method of claim 25 wherein said articles are in the form of sheets.

27. The method of claim 26 wherein the intervals between successive sheets being conveyed on the main line conveyor are about twelve seconds or less, and the vertical translating of step (b) and the vertical translating of step (d) are performed during said intervals.

* * * * *